(12) United States Patent
Kaneko et al.

(10) Patent No.: US 6,567,145 B1
(45) Date of Patent: May 20, 2003

(54) LIQUID CRYSTAL DISPLAY DEVICE HAVING CONDUCTIVE LINES FORMED WITH AMORPHOUS OXIDE CONDUCTIVE LAYER ON METAL LAYER AND METHOD OF FABRICATION THEREOF

(75) Inventors: Toshiki Kaneko, Chiba (JP); Kikuo Ono, Mobara (JP); Hajime Ikeda, Mobara (JP); Masatomo Terakado, Chiba (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/535,751

(22) Filed: Mar. 27, 2000

(30) Foreign Application Priority Data

Mar. 26, 1999 (JP) ............................................ 11-083689

(51) Int. Cl.$^7$ ....................... G02F 1/1343; G02F 1/136; G02F 1/13; H01L 21/302
(52) U.S. Cl. ........................... 349/139; 349/42; 349/46; 349/141; 349/187; 438/713
(58) Field of Search .............................. 349/42–47, 187, 349/138, 139, 141; 257/59, 72; 438/149–166, 713

(56) References Cited

U.S. PATENT DOCUMENTS

| | | | | |
|---|---|---|---|---|
| 4,704,559 A | * | 11/1987 | Suginoya et al. | 315/169.1 |
| 5,003,356 A | * | 3/1991 | Wakai et al. | 357/4 |
| 5,036,370 A | * | 7/1991 | Miyago et al. | 357/4 |
| 5,054,887 A | * | 10/1991 | Kato et al. | 359/59 |
| 5,428,250 A | * | 6/1995 | Ikeda et al. | 257/761 |
| 5,518,936 A | * | 5/1996 | Yamamoto et al. | 437/24 |
| 5,672,251 A | * | 9/1997 | Goto et al. | 204/192.17 |
| 5,731,856 A | * | 3/1998 | Kim et al. | 349/43 |
| 5,777,702 A | * | 7/1998 | Wakagi et al. | 349/152 |
| 5,834,797 A | * | 11/1998 | Yamanaka | 257/57 |
| 5,872,370 A | * | 2/1999 | Gu et al. | 257/66 |
| 5,995,177 A | * | 11/1999 | Fujikawa et al. | 349/147 |
| 6,081,308 A | * | 6/2000 | Jeong et al. | 349/42 |
| 6,107,668 A | * | 8/2000 | Ukita | 257/412 |
| 6,226,059 B1 | * | 5/2001 | Yamamoto et al. | 349/42 |
| 6,235,559 B1 | * | 5/2001 | Kuo | 438/149 |

FOREIGN PATENT DOCUMENTS

| | | | |
|---|---|---|---|
| JP | 62-285464 | * | 12/1987 |
| JP | 01-035422 A | * | 2/1989 |
| JP | 10-35422 | * | 2/1989 |
| JP | 01-180523 A | * | 7/1989 |
| JP | 1-180523 | * | 7/1989 |
| JP | 02-039130 A | * | 2/1990 |
| JP | 02-203568 A | * | 8/1990 |
| JP | 03-232274 A | * | 10/1991 |
| JP | 05-343685 | * | 12/1993 |
| JP | 10-311985 | * | 11/1998 |

* cited by examiner

*Primary Examiner*—Tarifur R. Chowdhury
(74) *Attorney, Agent, or Firm*—Antonelli, Terry, Stout & Kraus, LLP (57) ABSTRACT

The present invention provides a liquid crystal display device which can simplify patterning steps of signal wirings and electrodes during manufacture and can enhance the reliability by preventing the electrolytic corrosion of terminal portions or the like. At the time of forming electrodes and/or signal wirings on a substrate 1, an amorphous oxide conductive film 3 having a large etching rate is laminated onto a metal film 2 which is made of chromium or the like and is formed on the substrate 1, and these films are etched simultaneously in only one photolithography treatment.

25 Claims, 5 Drawing Sheets

LIQUID CRYSTAL DISPLAY DEVICE HAVING CONDUCTIVE LINES FORMED WITH AMORPHOUS OXIDE CONDUCTIVE LAYER ON METAL LAYER AND METHOD OF FABRICATION THEREOF

BACKGROUND OF THE INVENTION

The present invention relates to a liquid crystal display device and its manufacturing method, and more particularly to an active matrix type liquid crystal display device having active elements such as thin film transistors or the like and its manufacturing method.

The liquid crystal display device substantially uses a liquid crystal panel which sandwiches a liquid crystal layer between two sheets of substrates, wherein at least one substrate is made of transparent glass or the like. The liquid crystal display device is roughly classified into a type which performs lighting and lights-out of given pixels by selectively applying voltage to electrodes for forming pixels provided to these two substrates respectively (a so-called simple matrix type) and a type which performs lighting and lights-out of given pixels by forming a liquid crystal panel which disposes active elements (switching elements) for selecting pixels on the above-mentioned seed electrodes and then selecting these active elements (for example, an active matrix type which uses thin film transistors (TFT) as active elements).

Particularly, the latter active matrix type liquid crystal display devices have become the main stream of the liquid crystal display devices because of their high contrast performance, their high speed display performance and the like.

This active matrix type liquid crystal display device consists of a vertical electric field system which applies an electric field for changing the orientation direction of the liquid crystal layer between electrodes formed on one substrate and electrodes formed on the other substrate and a transverse electric field system (IPS: In-Plane Switching Mode) which applies an electric field for changing the orientation direction of the liquid crystal layer between electrodes formed on only one substrate in a direction parallel to the substrate.

In these liquid crystal display devices, signal wirings for supplying scanning signals and video signals to respective electrodes of the liquid crystal panel are formed such that the signal wirings extend from a display region of the liquid crystal panel to a terminal portion of an end periphery of the same panel.

Drive circuit chips (drive ICs) at terminal portions of respective wirings or a connection portion to which a flexible printed circuit board mounting the drive Ics is connected are coated with a conductive film made of an oxide so as to prevent inconveniences such as the increase of the contact resistance.

The liquid crystal display device of the vertical electric field type adopts an oxide transparent conductive film as such an oxide conductive film and the terminal portions of the wirings are coated with this oxide transparent conductive film.

In the liquid crystal display device of the transverse electric field type, however, since the orientation direction of the liquid crystal layer is changed by forming an electric field between electrodes (between a pixel electrode and a counter electrode) formed in parallel with the substrate, transparent electrodes are unnecessary.

On the other hand, to ensure the reliability of the terminal portions, that is, to prevent an electrolytic corrosion which oxidizes and gives rise to corrosion and dissolution of wiring and electrode forming materials upon supply of electricity, the terminal portions are coated with a transparent conductive film made of a chemically stable oxide.

As documents which disclose the liquid crystal display device of this transverse electric field system, Japanese patent publication Sho 63-21907, U.S. Pat. No. 4,345,249 and the like can be listed.

As described heretofore, in the liquid crystal display device of the transverse electric field system, although it is unnecessary to form the transparent conductive film on the pixel region, the transparent conductive film made of an oxide becomes necessary at the terminal portions to ensure the connection stability. Accordingly, the display region, all signal wirings at terminal portions and respective electrodes of the liquid crystal display device must be constructed such that a transparent conductive film is coated on an upper layer of a metal film and this gives rise to a drawback in reducing the number of steps of an etching (wet etching) by photolithography.

Besides the patterning of the metal film at the terminal portions, additional one photolithography step and one etching step become necessary for the patterning of transparent conductive film made of an oxide film so that the patterning of the terminal portions requires the photolithography step at least twice.

It is an object of the present invention to overcome the above-mentioned drawbacks of the prior art and to provide a liquid crystal display device and its manufacturing method which can simplify the patterning step of the signal wirings and the electrodes of the liquid crystal display device of the transverse electric field system and can enhance the reliability by preventing the electrolytic corrosion or the like of the terminal portions.

SUMMARY OF THE INVENTION

To achieve the above object, the present invention is characterized by realizing a liquid crystal display device of the transverse electric field system which is provided with signal wirings and various kinds of electrodes which are formed by patterning by making use of the difference of corrosion speed (etching rate) due to the corrosion potential difference between different kinds of metals.

The typical constitution of the liquid crystal display device of the present invention is described as follows.

That is, (1) Electrodes and/or signal wirings of a laminated structure which arranges an amorphous oxide conductive film having a large etching rate on a metal film are formed.

(2) In a liquid crystal display device wherein the device is comprised of one substrate on which gate electrodes which apply scanning signals through scanning signal wirings, drain electrodes which apply video signals through video signal wirings, thin film transistors which has source electrodes and counter electrodes are formed and the other substrate which has at least color filters, and a liquid crystal layer is sealed between one substrate and the other substrate, the whole or a portion of the scanning signal wirings, the video signal wirings, the gate electrodes, the drain electrodes, the source electrodes and counter electrodes are formed into a laminated structure which arranges an amorphous oxide conductive film having a large etching rate on an upper layer of a metal film.

(3) The metal film of (1) or (2) is formed by laminating two kinds of materials having different corrosion potentials.

(4) On the signal wirings and/or various kinds of electrodes, a thin film having a laminated structure which arranges an amorphous oxide conductive film having a lower corrosion potential than a metal film in an etchant on the upper surface of a metal film is formed and this thin film having a laminated structure is subjected to a desired patterning in an etching treatment step which performs photolithography only once.

(5) The metal film having a laminated structure of (4) is chromium or a chromium-molybdenum alloy and the oxide conductive film is an indium-tin-oxide.

(6) As the material of the amorphous oxide conductive film, an oxide of indium (In) or zinc (Zn) is used.

As material of the metal film, chromium (Cr), chromium-molybdenum (Cr—Mo), chromium-tungsten (Cr—W) or the like can be used.

The reason that the object of the present invention is achieved by the above-mentioned constitution is as follows. That is, in manufacturing an active matrix type liquid crystal panel which constitutes a liquid crystal display device of a transverse electric field system, on one substrate out of two substrates, gate wirings (scanning signal wirings), drain wirings (video signal wirings), source electrodes (although the source electrodes are connected to pixel electrodes, the source electrodes includes such pixel electrodes here) and counter electrodes (or called "common electrodes") are formed.

These wirings and electrodes are formed in a multi-layered structure where the metal oxide film is laminated to the upper layer of the metal film having a single or two layers. The metal oxide film which constitutes this multi-layered structure ensures the reliability of connection between wiring thereof and wirings of a printed circuit board or drive ICs against the oxidation of the terminals at the terminal portions of wirings thereof. Accordingly, it is no more necessary to add the photolithography exclusively for the protection of the terminal portions.

Further, using the oxide film in the amorphous state as this oxide conductive film, the oxide conductive film can be processed by the same etching together with the metal film which constitutes the lower layer. Etching of the oxide in the crystalline condition by an etchant (etching liquid) having strong acidity for metal wirings is extremely difficult and hence, usually, an etching treatment which uses a different etchant becomes necessary for etching the oxide in the crystalline condition.

This is because that the oxide film in the crystalline state has a high corrosion potential in the etchant so that it is hardly etched in the etchant for metal wirings. To the contrary, the oxide film in the amorphous state has a low corrosion potential even in the etchant for metal wirings and the corrosion potential is substantially equal to that of the metal film.

Accordingly, by optimizing the respective compositions of the etchant, the metal film and the oxide film, it becomes possible to simultaneously etch the metal film and the oxide film by using the same etchant.

With respect to the optimum materials for the combination of above-mentioned respective compositions, as the etchant, for example, an etchant which contains nitric acid second cerium ammonium aqueous solution as a main component or an etchant which contains phosphoric acid, nitric acid or acetic acid as a main component can be used.

As the metal film, pure chromium (Cr) or its alloy, molybdenum (Mo) and its alloy or a laminated film made of these metals can be used.

As the oxide film, that is, the oxide conductive film, an oxide made of indium (In), zinc (Zn) and oxygen (O) can be used. In particular, the In—Zn—O film has an advantage that it can maintain the amorphous structure even at the substrate temperature which is substantially as high as a temperature at the time of forming a chromium (Cr) film or a molybdenum (Mo) film. Furthermore, since the film forming temperature is high, the adherence of the oxide conductive film with the metal film can be ensured.

At the time of performing the wet etching of laminated wirings made of the oxide conductive film and the metal film, in addition to an advantage that they can be etched by using the same etchant, the end surface shape of the wirings can be formed into a normally tapered shape by adjusting respective etching rates.

By forming the end surface of wirings into a normally tapered shape, the coverage of the film which is coated on the upper portion thereof can be improved. That is, by applying a tapering processing to gate wirings and the counter wirings which constitute the lowermost portion, the shape of gate insulation films, a-Si films (semiconductor layers), the drain wirings and the source wirings (electrodes) can be similarly formed into a normally tapered shape and the coverage of a passivation film (a PAS film) which constitutes the uppermost layer can be improved so that the corrosion of wirings caused by the poor coverage of the PAS film can be prevented.

Further, since the uppermost portions of all wirings are coated with the oxide, there arises an advantage that the adherence between a photoresist and a wiring film in the photolithography step can be largely enhanced compared to the case that only the metal film is used.

Further, it is needless to say that the present invention is not limited to the above-mentioned constitutions and explanation and various modification are possible without departing from the technical idea of the present invention.

DETAILED DESCRIPTION OF THE PREFERRED EMBODIMENTS

The mode for carrying out the present invention is explained in conjunction with attached drawings which show several embodiments.

[Embodiment 1]

Figure 1:
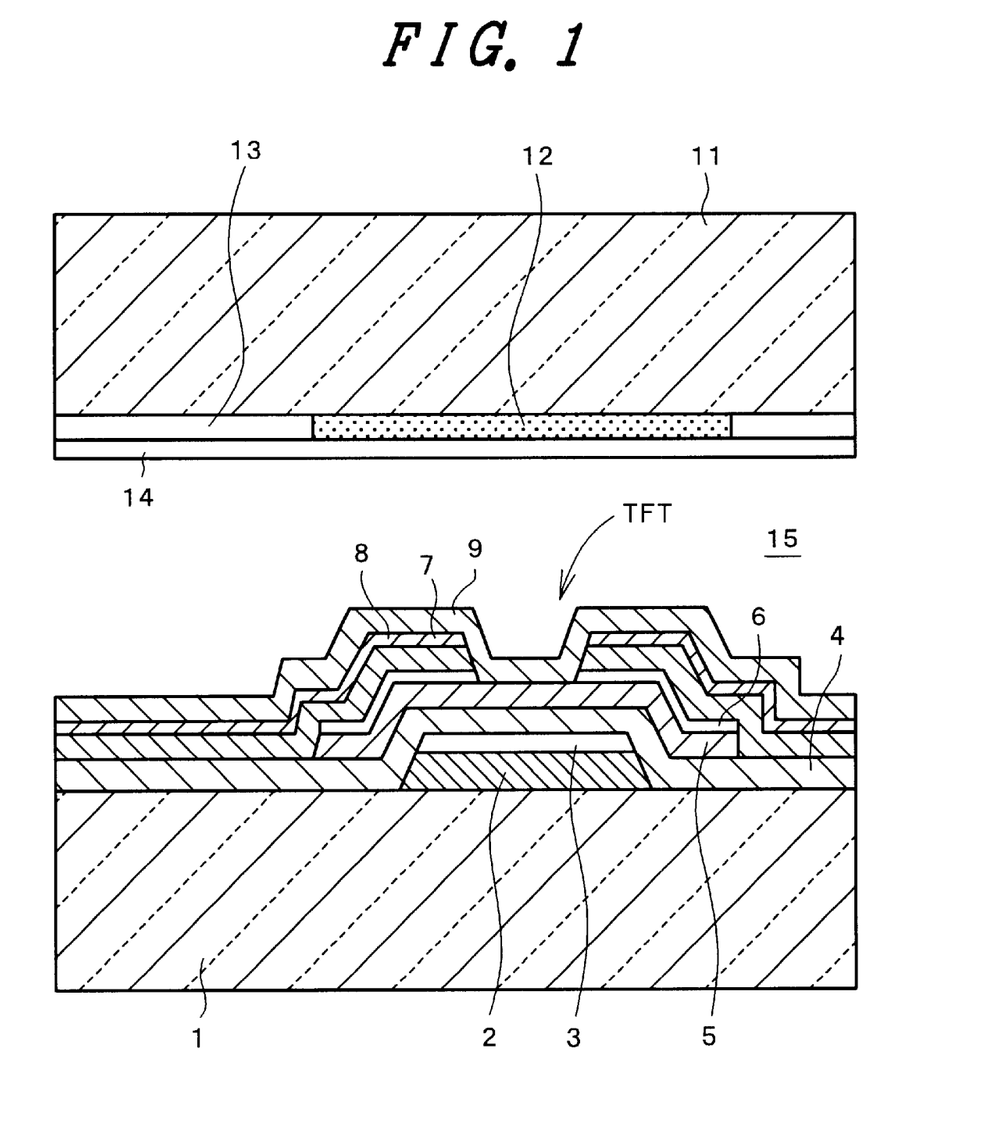
FIG. 1 is a schematic cross-sectional view of an essential part of the first embodiment of a liquid crystal display device of the present invention.

FIG. 1 is a schematic cross-sectional view of an essential portion for explaining the first embodiment of a liquid crystal display device of the present invention. Further, FIG.

Figure 2:
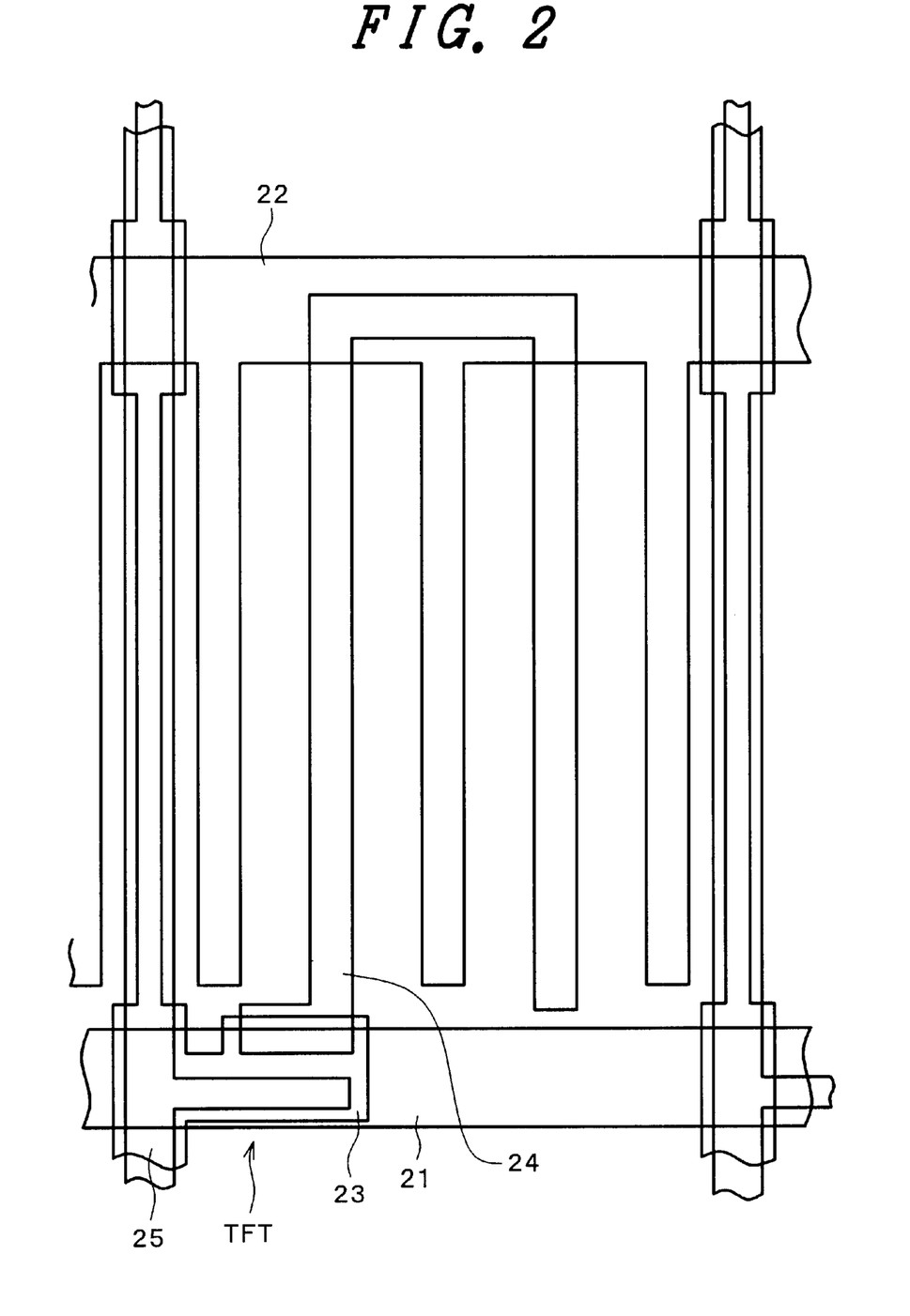
FIG. 2 is a schematic plan view of one pixel portion formed on an active matrix substrate for explaining the first embodiment of the liquid crystal display device of the present invention.

2 is a schematic plan view of one pixel portion formed on an active matrix substrate for explaining the first embodiment of the liquid crystal display device of the present invention.

In this liquid crystal display device, a liquid layer 15 is sandwiched between an active matrix substrate 1 which constitutes one substrate and a color filter substrate 11 which constitutes the other substrate. On the inner surface of the active matrix substrate 1, a gate wiring (electrode) having a multi-layered structure made of a metal film 2 and an amorphous oxide conductive film 3, a silicon nitride film 4 which constitutes an insulation film, a semiconductor film having a multi-layered structure made of an i– a-Si film 5 and a n+ a-Si film 6, a metal film 7 for wiring made of a source wiring (electrode) and a drain wiring (electrode), an amorphous conductive film 8 for wiring made of a source wiring (electrode) and a drain wiring (electrode), and a passivation film (PAS film) 9 are formed.

On the other hand, on the inner surface of the color filter substrate 11, color filters 13 of a plural colors which are defined by a black matrix 12 are formed as films and protective films 14 are coated on the upper layer of these color filters 13. On the interface defined between the protective film 14 and the liquid crystal layer 15 as well as on the interface between the active matrix substrate side of the passivation film 9 (PAS film) and the liquid crystal layer 15, orientation films which control the orientation of the liquid crystal composition which constitutes the liquid crystal layer 15 are coated respectively. Such orientation films, however, are omitted from the drawings.

A thin film for the metal wiring 2 made of chromium (Cr), chromium and molybdenum (Mo) alloy (Cr—Mo), chromium and tungsten (W) alloy (Cr—W) or the like is formed on the active matrix substrate 1 by a sputtering method at a film forming temperature of 120° C. Subsequently, the indium (In)-zinc (Zn)-oxygen (O) film 3 (IZO) is continuously formed at a film forming temperature of 120° C. in the same manner so as to form a metal film having a multi-layer structure.

Here, even when the substrate temperature at the time of forming the film is elevated higher than a room temperature, the In—Zn—O film 3 is not crystallized and maintains the amorphous state.

Then, after exposing this metal film using a photo mask for a gate wiring pattern, the metal film is etched with an etchant made of nitric acid second cerium ammonium aqueous solution so as to form a gate wiring 21. Simultaneous with forming of this gate wiring 21, a counter electrode wiring 22 which constitutes the other electrode for forming the pixel of the transverse electric field system is formed.

In FIG. 2, numeral 23 indicates an island of a-Si which constitutes a thin film transistor TFT, numeral 24 indicates a source electrode (this source electrode constituting a comb-shaped pixel electrode within one pixel), and numeral 25 indicates a drain wiring (electrode).

In this transverse electric field system, an electric field is generated between the comb-shaped pixel electrode 24 constituted by the source electrode 24 of the thin film transistor TFT and the counter electrode wiring 22 and the pixel is switched on or off by controlling the orientation of the liquid crystal layer.

Figure 3:
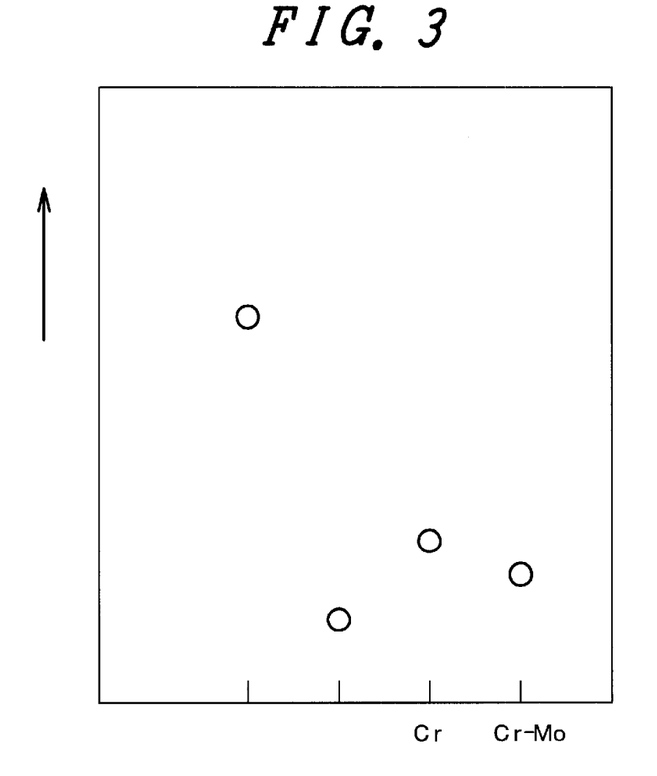
FIG. 3 is an explanatory view for explaining the corrosion potential of electrode forming materials in an etchant.

FIG. 3 is an explanatory view for explaining the corrosion potentials of electrode forming materials in the etchant. This explanatory view shows a case which uses nitric acid second cerium ammonium aqueous solution as the etchant and indicates respective corrosion potentials of a crystalline conductive film, an amorphous conductive film (ITO, IZO), chromium (Cr) and a chromium-molybdenum alloy (Cr—Mo) in the etchant.

As shown in the drawing, the corrosion potential of the amorphous conductive film is lower compared to that of the crystalline conductive film and is slightly lower than those of chromium (Cr) and the chromium-molybdenum (Cr—Mo) alloy. Accordingly, the crystalline conductive film is not etched in the etchant for chromium (Cr) or the chromium-molybdenum (Cr—Mo) alloy and hence, in case of etching the film having a multi-layered structure which laminates this crystalline conductive film onto the metal (Cr, Cr—Mo), an etching step which uses an etchant different from the etchant for metal use becomes necessary.

To the contrary, the amorphous conductive film can be simultaneously processed with the metal by using the etchant for the metal (Cr, Cr—Mo) by only one etching operation.

Further, as shown in FIG. 3, since the corrosion potential of the amorphous conductive film is slightly lower than those of the chromium (Cr) and the chromium-molybdenum (Cr—Mo), the etching of the amorphous conductive film progresses faster than these metal thin films. As a result, as shown in FIG. 1, the gate wiring (electrode) having a laminated structure can be formed into a normally tapered shape.

After completing the etching treatment of the gate wiring (electrode), a resist is peeled off and the Sin film 4, i– a-Si film 5 and the n+ a-Si film 6 are continuously formed by a plasma CVD method. Subsequently, to process the island 23 made of a-Si shown in FIG. 2, a resist is formed in the same manner as the patterning step of the gate wiring (electrode) and the i– a-Si film 5 and the n+ a-Si film 6 are etched by a dry etching method.

After peeling off the resist for processing the a-Si island, the Cr film and Cr—Mo film which will work as the source wiring (electrode) and the drain wiring (electrode) respectively and have the similar structure as the gate wiring (electrode) and the In—Zn—O film which will work as the amorphous conductive film are continuously formed thus forming a thin film having a laminated structure.

By subjecting the formed thin film having the laminated structure to the photolithography step, the source wiring (electrode) 24 and the drain wiring (electrode) 25 are simultaneously formed. In the similar manner as the gate wiring (electrode), the above-mentioned thin film having the laminated structure is integrally etched using the aqueous solution containing nitric acid cerium ammonium as a main component (etchant).

Subsequently, using the patterns of the source wiring (electrode) 24 and the drain wiring (electrode) 25 as masks, the n+ a-Si film 6 which constitutes a channel portion is etched by a dry etching method. Thereafter, a SiN film 9 is formed as a passivation film by a CVD method.

With the use of the above-mentioned method, by applying the photoetching step to the active matrix substrate of the liquid crystal display device of the transverse electric field system four times, the thin film transistor can be formed.

Although the above-mentioned wiring structure (electrode structure) has the laminated structure made of the amorphous conductive film and the metal film, the metal film may also have the laminated structure.

[Embodiment 2]

Figure 4:
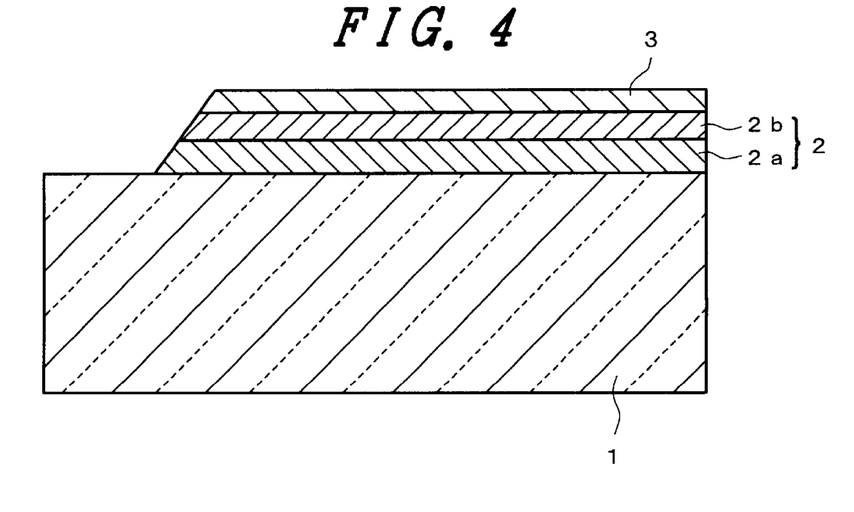
FIG. 4 is a schematic cross-sectional view of an essential part for explaining the second embodiment of the liquid crystal display device of the present invention.

FIG. 4 is a schematic cross-sectional view of an essential portion for explaining the second embodiment of the liquid crystal display device of the present invention. In this embodiment, a chromium-molybdenum alloy (Cr—Mo) film 2b is laminated onto a pure chromium (Cr) film 2a so as to form a metal film 2 having a laminated structure and an indium zinc oxide (In—Zn—O) film 3 is laminated onto the upper layer of the metal film 2.

With such a laminated structure where the indium zinc oxide (In—Zn—O) film 3 is laminated onto the metal film 2 having a laminated structure made of the pure chromium (Cr) film 2a and the chromium-molybdenum alloy (Cr—Mo), the entire laminated structure can be formed in a tapered shape by only one photolithoetching while making use of the difference of the etching rates of respective layers as explained in view of FIG. 3.

The oxide conductive film 3 laminated onto the metal film 2 may be any oxide in the amorphous state and an indium tin oxide (In—Sn—O:ITO) film formed at a room temperature or other oxide conductive films may be used besides the above-mentioned indium zinc oxide (In—Zn—O) film.

In case the indium zinc oxide (In—Zn—O) film is used as the oxide conductive film 3, the film maintains the amorphous state in the succeeding film forming step using a CVD method or the like, while in ease the ITO formed at a room temperature is used as the oxide conductive film 3, the film may be subjected to the above-mentioned photolithoetching in the amorphous state and then may be subjected to a heating step such as a CVD film forming step and finally may be formed in the crystalline state.

[Third Embodiment]

In this embodiment, a metal layer having a laminated structure is made of an alloy containing molybdenum (Mo) as the main component. In case of using such a molybdenum alloy, an etchant which is comprised of phosphate, nitric acid, acetic acid and water is used as the etchant for the alloy.

In this embodiment, an indium zinc oxide film formed as an upper layer is also etched by this etchant and hence, the film having a laminated structure can be etched simultaneously. The difference of etching rates between the indium zinc oxide film and the molybdenum alloy film may be controlled such that the etching rates of both oxides or the difference of corrosion potential is controlled by changing the components of the etchant.

Further, in case of using a molybdenum (Mo) alloy, if there is any possibility that the adherence of the molybdenum alloy with a glass substrate which works as a backing is poor and hence is peeled off, an indium zinc oxide film is also formed on the lower layer of the molybdenum (Mo) alloy to form the three layered laminated structure thus improving the adherence between the molybdenum (Mo) alloy layer and the backing layer.

In this manner, according to respective embodiments of the present invention, the etching step in the photolithography step for patterning various kinds of wirings and electrodes which constitute the liquid crystal panel can be simplified and the liquid crystal display device of high reliability with the occurrence of the least disconnection or the like can be obtained.

Some specific examples of the liquid crystal display device provided with various kinds of wirings (electrodes) patterned in the above-mentioned manner is explained hereinafter.

Figure 5:
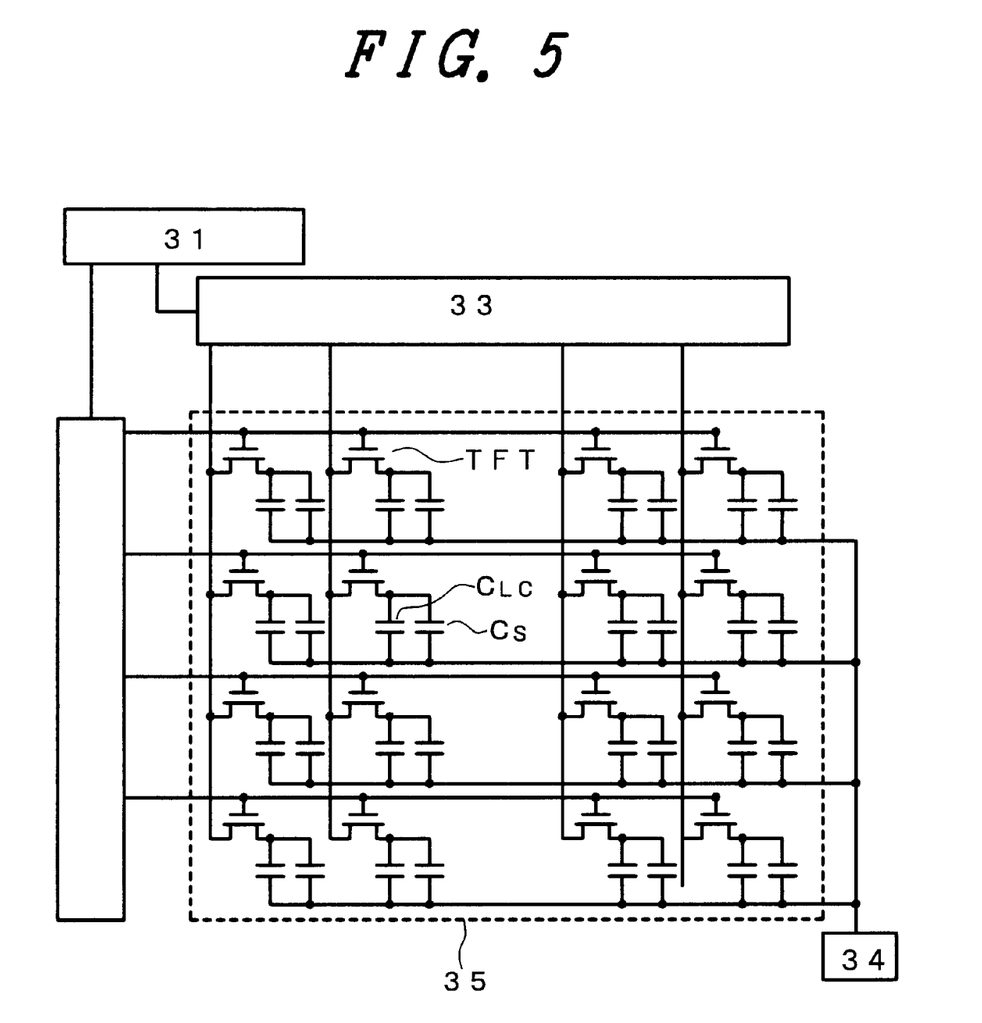
FIG. 5 is a conceptual view of a drive circuit of the liquid crystal display device of the present invention.

FIG. 5 is a conceptional view of drive circuits of the liquid crystal display device of the present invention, wherein numeral 31 indicates a control circuit, numeral 32 indicates a scanning electrode (gate electrode) drive circuit, numeral 33 indicates a video signal electrode (drain electrode) drive circuit, numeral 34 indicates a counter electrode drive circuit, and numeral 35 indicates an effective display region of the liquid crystal panel. In the drawing, CLC indicates a capacitance component of the liquid crystal and CS indicates a holding capacitance.

The thin film transistors TFT which are formed in the effective display region 35 of the liquid crystal panel and perform the switching of respective pixels are selectively turned on or off by the scanning electrode drive circuit 32, the video signal electrode drive circuit 33 and the counter electrode drive circuit 34. This turning on and off of the thin film transistors TFT is controlled by the control circuit 31.

Figure 6:
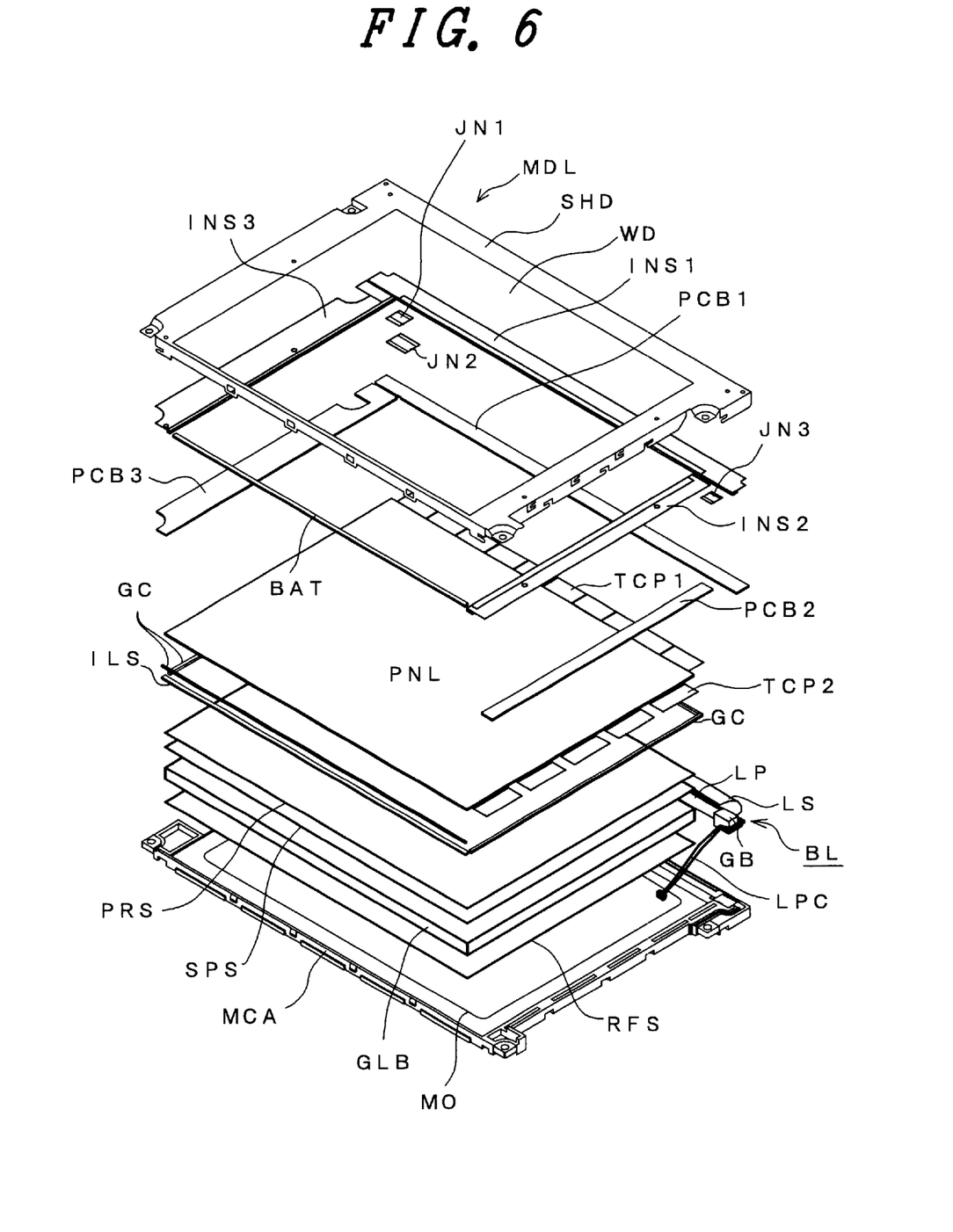
FIG. 6 is a developed perspective view for explaining the entire constitution of the liquid crystal display device of the present invention.

FIG. 6 is a developed perspective view for explaining an example of the entire constitution of the liquid crystal display device of the present invention. This drawing explains the specific constitution of the liquid crystal display device of the present invention. Hereinafter, a unit constituted by integrally forming the liquid crystal panel, a circuit board, a back light and other constituent members is called a liquid crystal display module "MDL".

In the drawing, SHD indicates a shield case (also called "metal frame") made of a metal plate, WD indicates a display window, INS1–3 indicate an insulation sheet, PCB1–3 indicate printed circuit boards, wherein the PCB1 indicates the drain side printed circuit board (printed circuit board for driving video signal wirings), the PCB2 indicates the gate side printed circuit board (printed circuit board for driving scanning signal wirings) and the PCB3 indicates the interface printed circuit board. Further, in the drawing, JN1–3 indicate joiners which electrically connect the printed circuit boards PCB1–3, TCP1 and TCP2 indicate tape carrier packages, PNL indicates a liquid crystal panel, GC indicates a rubber cushion, ILS indicates a light shielding spacer, PRS indicates a prism sheet, SPS indicates a diffusion sheet, GLB indicates a light guide plate, RFS indicates a reflection sheet, MCA indicates a lower side case (molded frame) formed by integral molding, MO indicates an opening of the MCA, LP indicates a fluorescent tube, LPC indicates a lamp cable, GB indicates a rubber bushing for supporting the fluorescent tube LP, BAT indicates a both sides adhesive tape, and BL indicates a back light made of the fluorescent tube, the light guide plate and the like. The liquid crystal display module MDL is assembled by laminating them together with diffusion plate members while holding the arrangement shown in the drawing.

The liquid crystal display module MDL includes two accommodating and holding members made of the lower side case MCA and the shield case SHD. Metalic the shield case SHD which accommodates and fixes the insulation sheets INS1–3, the printed circuit boards PCB1–3 and the liquid crystal display panel PNL therein and the lower side case MCA which accommodates the backlight BL made of the fluorescent tube LP, the light guide plate GLB, the prism sheet PRS and the like are merged to form the liquid crystal display module MDL.

Integrated circuit chips for driving respective pixels of the liquid crystal display panel PNL are mounted on the printed circuit board PCB1 for driving the video signal wirings, while integrated circuit chips which receive video signals from an outside host and control signals such as timing signals, a timing converter TCON which processes the timing and generates clock signals and the like are mounted on the interface printed circuit board PCB3.

The clock signals generated by the timing converter are supplied to the integrated circuit chips mounted on the printed circuit board PCB1 for driving video signal wirings by way of clock signal wirings CLL installed in the interface printed circuit board PCB3 and the printed circuit board PCB1 for driving video signal wirings.

The interface printed circuit board PCB3 and the printed circuit board PCB1 for driving the video signal wirings are made of multi-layered wiring substrate and the clock signal wirings CLL are formed as inner layer wirings of the interface printed circuit board PCB3 and the printed circuit board PCB1 for driving video signal wirings.

In the liquid crystal panel PNL, the printed circuit board PCB1 for driving video signal wirings, the printed circuit board PCB2 for driving scanning signal wirings and the interface printed circuit board PCB3 which are provided for driving the thin film transistor TFT are connected by the tape carrier packages TCP1 and TCP2 and joiners JN1, 2, 3 are provided between respective printed circuit boards for connection.

According to the above-mentioned liquid crystal display device, the manufacturing steps of various wirings and electrodes of the liquid crystal panel can be shortened and the liquid crystal display device which can decrease the occurrence of disconnection or the like and has the high reliability can be provided.

As has been described heretofore, according to the present invention, various kinds of wirings or electrodes of the liquid crystal panel adopt the laminated structure which laminates the oxide conductive film in the amorphous state onto the metal film and hence, the wirings or the electrodes can be patterned simultaneously by using the same etchant and it becomes easy to make the side peripheries of the formed wirings or electrodes have a normally tapered shape so that the occurrence of nucleus spots such as disconnection can be prevented. In particular, the resistance against electrolytic corrosion at the terminal portions can be greatly enhanced. Accordingly, the liquid crystal display device of high reliability which can be manufactured at a low cost and can obviate the insufficient display can be provided.

What is claims:

1. A liquid crystal display device comprising:
   a pair of substrates;
   a liquid crystal layer interposed between said pair of substrates;
   electrodes or signal lines formed on one of said pair of substrates; and
   back light arranged behind said one of said pair of substrates,
   wherein the liquid crystal display device is a transverse electric field system device, and all of source electrodes, drain electrodes, pixel electrodes and drain lines include an amorphous oxide conductive layer and a metal layer, and said amorphous oxide conductive layer is positioned on said metal layer such that the metal layer is between the amorphous oxide conductive layer and said one of said pair of substrates.

2. A liquid crystal display device comprising:
   a pair of substrates;
   a liquid crystal layer interposed between said pair of substrates;
   gate electrodes for applying scanning signals through gate lines, drain electrodes for applying video signals through drain lines, and thin film transistors, each of which has a source electrode and a drain electrode formed on one of said pair of substrates; and
   at least color filters formed on the other of said pair of substrates;
   wherein all of said gate lines, said drain lines, said gate electrodes, said source electrodes, and said drain electrodes include an amorphous oxide conductive film positioned on a metal film such that the metal film is between the amorphous oxide conductive film and said one of said pair of substrates.

3. A liquid crystal display device according to any one of claim 1 and claim 2, wherein said metal film includes two kinds of materials having different corrosion potentials.

4. A liquid crystal display device according to claim 1, wherein said amorphous oxide conductive layer has a larger etching rate than that of said metal layer.

5. A liquid crystal display device according to claim 1, wherein said amorphous oxide conductive layer and said metal layer have a tapered shape.

6. A liquid crystal display device according to claim 1, wherein said amorphous oxide conductive layer is oxide of any one or more of In, Sn and Zn.

7. A liquid crystal display device according to claim 1, wherein the metal layer is of one or more materials selected from the group consisting of chromium or an alloy thereof, molybdenum or an alloy thereof and laminated films of chromium and molybdenum, and wherein the amorphous oxide conductive layer is oxide of any one or more of In, Sn and Zn.

8. A liquid crystal display device according to claim 1, wherein a width of said amorphous oxide conductive layer on said metal layer, in a direction parallel to a surface of the one of the substrates on which the electrodes or signal lines are formed, is smaller than a width of said metal layer.

9. A liquid crystal display device according to claim 1, wherein the liquid crystal display device includes pixels, each pixel including a plurality of said pixel electrodes.

10. A liquid crystal display device according to claim 1, wherein said amorphous oxide conductive layer is selected from the group consisting of an amorphous indium-zinc-oxide conductive layer and an amorphous indium-tin-oxide conductive layer.

11. A liquid crystal display device according to claim 2, wherein said amorphous oxide conductive film has a larger etching rate than that of said metal film.

12. A liquid crystal display device according to claim 2, wherein said amorphous oxide conductive film and said metal film have a tapered shape.

13. A liquid crystal display device according to claim 2, wherein said amorphous oxide conductive film is oxide of any one or more of In, Sn and Zn.

14. A liquid crystal display device according to claim 2, wherein the metal film is of one or more materials selected from the group consisting of chromium or an alloy thereof, molybdenum or an alloy thereof and laminated films of chromium and molybdenum, and wherein the amorphous oxide conductive film is oxide of any one or more of In, Sn and Zn.

15. A liquid crystal display device according to claim 2, wherein a width of said amorphous oxide conductive film on said metal layer, in a direction parallel to a surface of the one of the pair of substrates on which the source electrode and the drain electrode of each thin film transistor are formed, is smaller than a width of said metal film.

16. A liquid crystal display device according to claim 2, wherein said amorphous oxide conductive film is selected from the group consisting of an amorphous indium-zinc-oxide conductive film and an amorphous indium-tin-oxide conductive film.

17. A liquid crystal display device according to claim 2, wherein said liquid crystal display device is a transverse electric field system device, having pixels with plural pixel electrodes in each pixel, the plural pixel electrodes also including said amorphous oxide conductive film positioned on said metal layer.

18. A substrate with thin film transistor, comprising:

a transparent substrate;

gate electrodes for applying scanning signals through gate lines, drain electrodes for applying video signals through drain lines, and thin film transistors, each of which has a source electrode and a drain electrode formed on said substrate;

wherein all of said gate lines, said drain lines, said gate electrode, said source electrodes, and said drain electrodes include an amorphous oxide conductive film and a metal film, with the amorphous oxide conductive film positioned on the metal film such that the metal film is between the amorphous oxide conductive film and the transparent substrate.

19. A substrate with thin film transistor according to claim 18, wherein said metal film includes two kinds of materials having different corrosion potentials.

20. A substrate with thin film transistor according to claim 18, wherein said amorphous oxide conductive film has a larger etching rate than that of said metal film.

21. A substrate with thin film transistor according to claim 18, wherein said amorphous oxide conductive film and said metal film have a tapered shape.

22. A substrate with thin film transistor according to claim 18, wherein said amorphous oxide conductive film is oxide of any one or more of In, Sn and Zn.

23. A substrate with thin film transistor according to claim 18, wherein a width of said amorphous oxide conductive film on said metal film, in a direction parallel to a surface of the transparent substrate on which the source and drain electrodes of each thin film transistor are formed, is smaller than a width of said metal film.

24. A substrate with thin film transistor according to claim 18, wherein said amorphous oxide conductive film is selected from the group consisting of an amorphous indium-zinc-oxide conductive film and an amorphous indium-tin-oxide conductive film.

25. A substrate with thin film transistor according to claim 18, wherein said substrate has pixels with plural pixel electrodes in each pixel, the plural pixel electrodes also including said amorphous oxide conductive film positioned on said metal film.

* * * * *